United States Patent
Cress

(10) Patent No.: US 10,174,667 B1
(45) Date of Patent: Jan. 8, 2019

(54) PRECHAMBER IGNITION DEVICE FOR INTERNAL COMBUSTION ENGINES AND METHOD

(71) Applicant: Caterpillar Inc., Peoria, IL (US)

(72) Inventor: James Cress, West Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/816,346

(22) Filed: Nov. 17, 2017

(51) Int. Cl.
*F02B 19/08* (2006.01)

(52) U.S. Cl.
CPC .................................. *F02B 19/08* (2013.01)

(58) Field of Classification Search
CPC ........................................................ F02B 19/08
See application file for complete search history.

(56) References Cited

U.S. PATENT DOCUMENTS

| | | | | |
|---|---|---|---|---|
| 4,124,000 A * | 11/1978 | Genslak | ............... | F02B 3/00 123/256 |
| 5,105,780 A | 4/1992 | Richardson | | |
| 5,555,867 A * | 9/1996 | Freen | ............... | F02B 19/08 123/260 |
| 6,854,439 B2 | 2/2005 | Regueiro | | |
| 8,839,762 B1 * | 9/2014 | Chiera | ............... | F02B 19/108 123/256 |
| 9,653,887 B1 * | 5/2017 | Niessner | ............... | H01T 13/16 |
| 9,739,192 B2 | 8/2017 | Willi | | |
| 2003/0213461 A1 * | 11/2003 | Regueiro | ............... | F02B 19/08 123/262 |
| 2015/0020766 A1 * | 1/2015 | LaPointe | ............... | F02B 19/16 123/285 |
| 2015/0040845 A1 * | 2/2015 | Chiera | ............... | F02B 19/108 123/41.32 |
| 2016/0053668 A1 * | 2/2016 | Loetz | ............... | F02B 19/1085 123/260 |
| 2016/0230646 A1 * | 8/2016 | Kim | ............... | F02B 19/18 |
| 2017/0167357 A1 | 6/2017 | Maier et al. | | |

FOREIGN PATENT DOCUMENTS

| | | |
|---|---|---|
| EP | 971107 A2 | 1/2000 |
| WO | 2016075358 A1 | 5/2016 |
| WO | 2017003460 A1 | 1/2017 |
| WO | 2017093598 A1 | 6/2017 |

* cited by examiner

*Primary Examiner* — Joseph Dallo
(74) *Attorney, Agent, or Firm* — Jonathan F. Yates

(57) ABSTRACT

A prechamber ignition device for a spark-ignited internal combustion engine has a prechamber in fluid communication with a main combustion chamber by way of a plurality of ports. An outer opening of each of the plurality of ports is formed in an exterior surface of a prechamber body and circumferentially offset from a corresponding inner opening formed in an interior surface of the prechamber body, the interior surface forming a prechamber wall having a taper that assists in maintaining velocity of a charge of air and fuel to displace a flame kernel from a spark gap in the prechamber such that quenching of the flame kernel is prevented.

20 Claims, 7 Drawing Sheets

PRECHAMBER IGNITION DEVICE FOR INTERNAL COMBUSTION ENGINES AND METHOD

TECHNICAL FIELD

The present disclosure relates generally to a prechamber ignition device for an internal combustion engine and, more particularly, to a prechamber ignition device structured to produce and maintain swirling of a charge of fuel and air in a prechamber.

BACKGROUND

Internal combustion engines, including gasoline or natural gas spark-ignited engines, diesel compression ignition engines, gaseous fuel engines, and still others, generally operate by producing a controlled combustion reaction within a cylinder, which drives a piston to rotate a crankshaft. This basic technique has been used to operate engines with traditional fuels such as gasoline or diesel for well over a century. Emissions concerns, and price and supply concerns, amongst others, have led to an interest in and exploitation of less traditional fuels, notably, natural gas. These fuels commonly are used at a higher stoichiometric air-to-fuel ratio, or so-called "lean" fuel mixtures, having an equivalence ratio less than 1. A traditional combustion engine ignition strategy that relies on a spark plug may fail to properly ignite these lean fuel mixtures, which can result in engine knock or other problems. Use of a prechamber ignition device can address these issues by igniting a charge of the lean fuel mixture in a prechamber before delivering a jet of hot combustion gases to a main combustion chamber, resulting in a hotter, more uniform, and typically more robust combustion reaction as compared to other techniques.

The use of a prechamber ignition device alone does not make a lean fuel mixture more combustible, however, meaning lean fuel mixtures may still fail to ignite in the prechamber itself. In particular, it has been observed that a flame kernel formed at a spark gap in the prechamber may be quenched, or extinguished, before the flame kernel produced a stable flame that can propagate to initiate combustion of the charge of air and fuel, resulting in a so-called "lean" misfire.

Several attempts have been made to more reliably initiate combustion of lean fuel mixtures in a prechamber. One such strategy is disclosed in U.S. Pat. No. 8,839,762 to Chiera et al. ("Chiera"). Chiera discloses a multi-chamber igniter that is apparently structured to prevent quenching by pushing a newly formed flame kernel to a separate chamber, thereby isolating the flame kernel from gases in the prechamber. While this and other strategies may facilitate prechamber combustion in certain aspects, there remains ample room for improvement.

SUMMARY OF THE INVENTION

In one aspect, a prechamber ignition device for an internal combustion engine includes a prechamber body that includes an exterior surface and an interior surface that defines a prechamber and includes a prechamber wall, the prechamber body having a proximal end structured for coupling with a spark electrode assembly, and a distal end, with a longitudinal axis extending between the proximal end and the distal end. The prechamber ignition device further includes a plurality of ports formed in the prechamber body at the distal end and each having an outer opening formed in the exterior surface and an inner opening formed in the interior surface, with each of the plurality of outer openings being circumferentially offset from the corresponding one of the inner openings such that the plurality of ports are oriented relative to the prechamber wall to induce swirling in an incoming charge of air and fuel, and the prechamber wall extending circumferentially around the longitudinal axis and having a taper that narrows in a direction of the proximal end.

In another aspect, a combustion charge formation system for an internal combustion engine includes a combustion chamber formed in an engine housing and a prechamber ignition device including a prechamber body defining a longitudinal axis extending between a proximal end and a distal end of the prechamber body, a prechamber formed within the prechamber body and including a prechamber wall, and a spark electrode assembly. The combustion charge formation system further includes a port formed in the prechamber body and fluidly connecting the combustion chamber with the prechamber, the port extending between an outer opening and an inner opening, and the inner opening being offset from the outer opening such that the port is oriented relative to the prechamber wall to induce swirling in an incoming charge of fuel and air, the prechamber wall having a taper that narrows in the direction of the spark electrode assembly, and the spark electrode assembly having an electrode prong forming a spark gap with the prechamber wall for igniting the charge of air and fuel.

In still another aspect, a method of operating an internal combustion engine includes admitting air and fuel from a combustion chamber into a prechamber in response to travel of a piston in a compression stroke of an engine cycle, contacting the air and fuel with a prechamber wall so as to induce swirling of the air and fuel, conveying the air and fuel upwardly towards a spark gap within the prechamber, conveying the air and fuel into a taper formed by the prechamber wall such that a reduction to a velocity of the air and fuel is limited. The method further includes spark igniting the air and fuel at a spark gap to form a flame kernel, and displacing the flame kernel from the spark gap by way of the air and fuel so as to limit quenching of the flame kernel.

DETAILED DESCRIPTION

Figure 1:
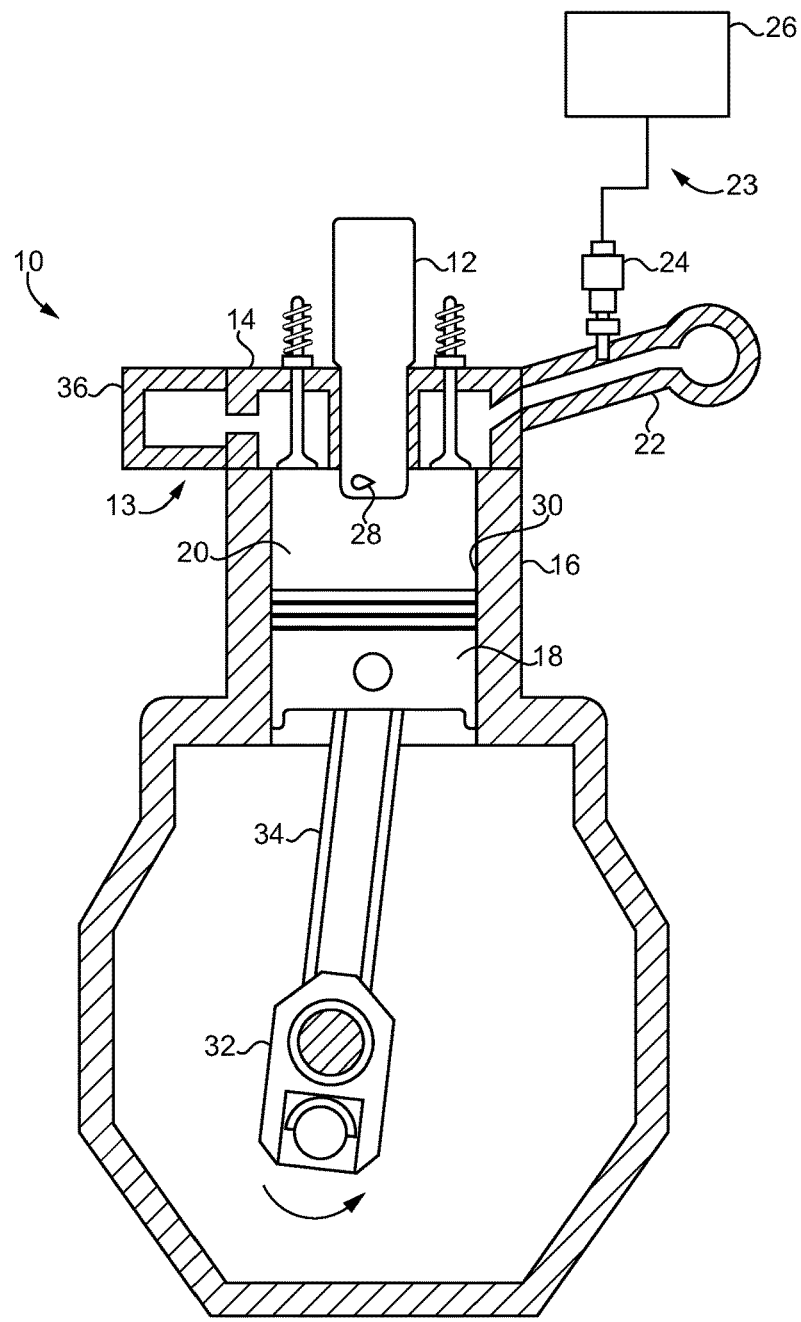
FIG. 1 is a diagrammatic illustration of an internal combustion engine having a prechamber ignition device, according to one embodiment.

Referring now to FIG. 1, a diagrammatic view of a spark-ignited internal combustion engine 10 having a prechamber ignition device ("prechamber device") 12 is shown. Engine 10 includes an engine housing 13 that has an engine head 14 and an engine block 16. Engine head 14 and engine block 16, together with a piston 18, form a combustion chamber 20 structured to receive air and potentially also fuel by way of an intake runner or an intake duct 22. Intake duct 22 may be coupled with a fuel supply conduit 23 configured to provide a fuel to combustion chamber 20 by way of a fuel admission valve or a fuel injector 24, though embodiments are also contemplated where fuel is introduced upstream of a compressor in a turbocharger (not shown). Further, a fuel supply 26 is fluidly coupled with fuel injector 24.

Prechamber device 12 has one or more ports 28, and may be supported within engine 10 by engine head 14 such that ports 28 are positioned within combustion chamber 20. Engine 10 may be a four-stroke, gaseous-fuel engine operated on a gaseous fuel such as natural gas, propane, biogas, landfill gas, or still others, though one of skill in the art will recognize that the present disclosure is not thusly limited and may be implemented in any engine having a spark-ignited prechamber ignition device. Vaporization and pressurization equipment for the fuel (not shown) can also be provided, in a generally known manner. Engine 10 could also be a dual gaseous fuel and liquid fuel engine. Piston 18 may be disposed in a cylinder 30 defined by engine block 16, and movable between a top dead center (TDC) position and a bottom dead center (BDC) position to rotate a crankshaft 32 by way of a connecting rod 34 in a generally conventional manner. Engine 10 may include any number of cylinders 30 and pistons 18 disposed in any suitable configuration, such as an "in-line" configuration or a "V" configuration.

A volume of combustion chamber 20 may vary with the position of piston 18 relative to engine head 14, such that the volume of combustion chamber 20 is at a maximum when piston 18 is located at the BDC position, and the volume is at a minimum when piston 18 is located at the TDC position. Rotation of crankshaft 32 moves piston 18 from the TDC position towards the BDC position in an intake stroke, which allows air and fuel to be introduced to combustion chamber 20 from intake duct 22. Continued rotation of crankshaft 32 then causes piston 18 to move towards the TDC position in a compression stroke that compresses air and fuel in combustion chamber 20. Upward travel of piston 18 during the compression stroke also causes air and fuel from combustion chamber 20 to be admitted into prechamber device 12 via ports 28. The air and fuel in prechamber device 12 may then be ignited, with the combustion gases being discharged through ports 28 to combustion chamber 20 to ignite the main charge of air-fuel mixture in combustion chamber 20 to drive piston 18 in an expansion stroke. Residual gases remaining in combustion chamber 20 after combustion may then be discharged through an exhaust duct 36 when crankshaft 32 once again causes piston 18 to move from the BDC position towards the TDC position in an exhaust stroke.

Figure 2:
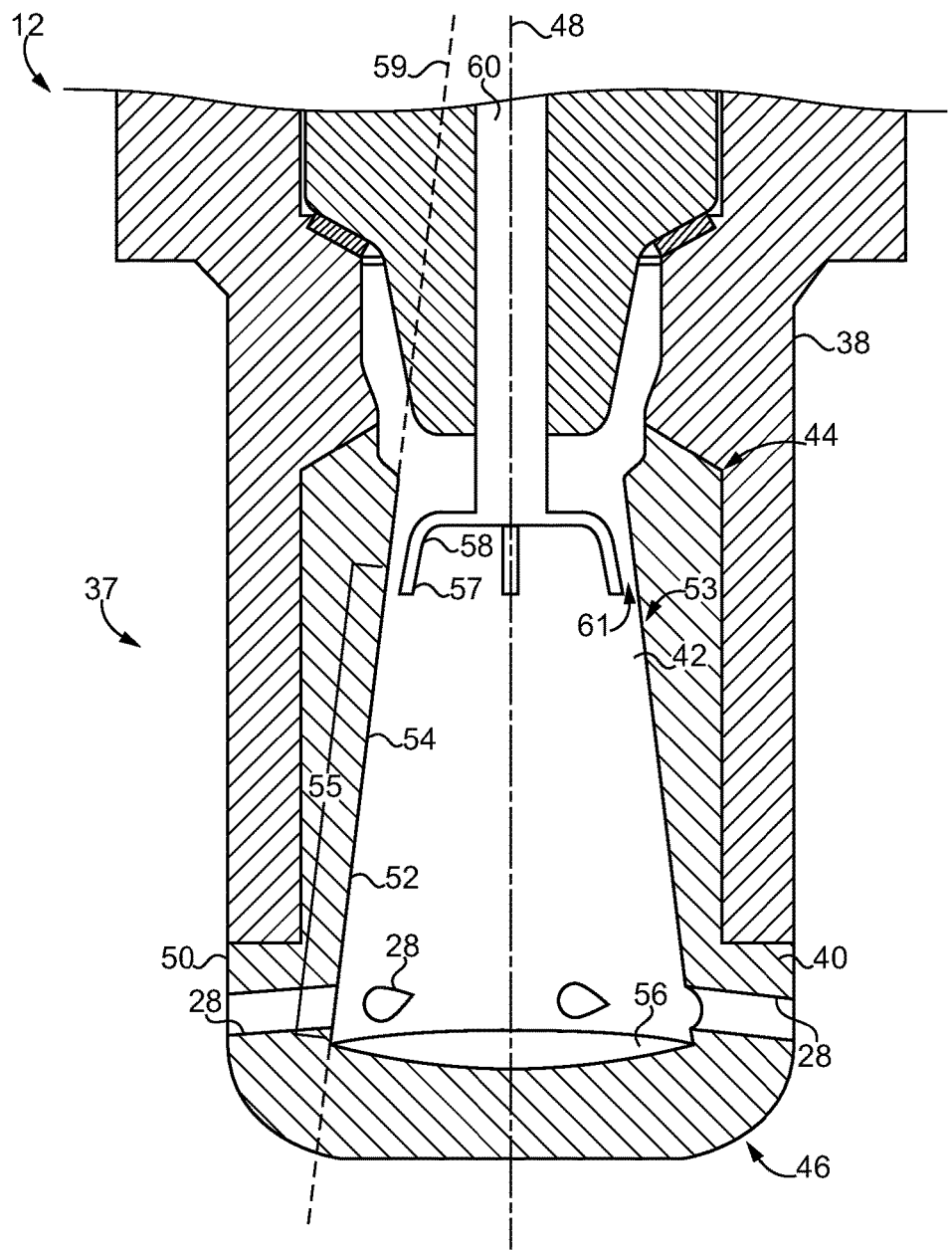
FIG. 2 is a diagrammatic illustration of a prechamber ignition device, according to one embodiment.

Referring now also to FIG. 2, a diagrammatic view of a combustion charge formation system 37 that includes prechamber device 12 is shown according to one embodiment. Prechamber device 12 includes a base 38 attached to a prechamber body 40, with a prechamber 42 formed within prechamber body 40. Prechamber body 40 has a proximal end 44 and a distal end 46, and defines a longitudinal axis 48 extending between proximal end 44 and distal end 46. Longitudinal axis 48 can also be a longitudinal center axis of prechamber 42, in most embodiments. Prechamber body 40 also includes an exterior surface 50, and an interior surface 52, with interior surface 52 having a prechamber wall 54 with a taper 53. Prechamber device 12 may further include a spark electrode assembly 60, with proximal end 44 of prechamber body 40 being structured for coupling with spark electrode assembly 60. Spark electrode assembly 60 may include one or more electrode prongs 58, each having a tip 57 positioned within prechamber 42 adjacent to prechamber wall 54 and within or adjacent to taper 53. A spark gap, one of which is shown at 61, is formed between prechamber wall 54 and each tip 57. Spark electrode assembly 60 is structured for energizing with a power supply (not pictured) to produce a spark at spark gap 61 that arcs between tip(s) 57 and prechamber wall 54, for igniting a charge of air and fuel in prechamber 42. Spark gap(s) 61, hereinafter referred to in the singular, may be located at an axial location that is within or adjacent to taper 53. It will be appreciated that spark electrode assembly 60 can be assembled in prechamber device 12 by inserting spark electrode assembly 60 through proximal end 44. It will generally be desirable to avoid touching electrode tips 57 to prechamber wall 54 during assembly to, for example, avoid the risk of deforming components and thus deviating from a specified spark gap distance once the components are assembled. Tips 57 can be positioned at a specified spark gap distance from prechamber wall 54 and within taper 53 or adjacent to taper 53. It will generally be desirable to position tips 57 so as to position spark gap 61 within a swirling flow of fuel and air within prechamber 42, as further discussed herein.

Prechamber wall 54 extends circumferentially around longitudinal axis 48, with taper 53 narrowing in the direction of proximal end 44 and spark electrode assembly 60. Taper 53 might extend at least a majority of a length 55 of prechamber wall 54 between proximal end 44 and distal end 46, and may extend at least a majority of a length of prechamber wall 54 between a floor 56 and spark gap 61. Taper 53 may be substantially uniform in that prechamber wall 54 has a uniform inclination, within manufacturing tolerances, relative to longitudinal axis 48 between floor 56 of prechamber 42 and spark gap 61, such that prechamber 42 defines a straight line in a section plane 59 through longitudinal axis 48 as shown in FIG. 2, for example. Put differently, taper 53 may be structured such that prechamber wall 54 has a substantially right circular conical shape, with a diameter of prechamber 42 at distal end 46 being larger than a diameter of prechamber 42 at proximal end 44, although embodiments in which prechamber 42 has a different shape such as a conoidal shape with curvilinear sides are also contemplated. In some embodiments, taper 53 might be structured such that prechamber wall 54 is angled to longitudinal axis 48 at an angle greater than 45°. An inclination of prechamber wall 54 may be greater than 60°, typically greater than 75°, although the present disclosure is not thusly limited. In some other embodiments, taper 53 may be structured such that a diameter of prechamber 42 at floor 56 is less than length 55. A diameter of prechamber 42 at spark gap 61 may be less than a diameter at ports 28 by a factor of two, or less. Prechamber wall 54 may be adjacent to and adjoin floor 56 at a common periphery, and prechamber 42 may be substantially frustoconical in shape. Floor 56 may have a continuous extent such that floor 56 is not perforated, with an entirety of ports 28 extending radially outward relative to longitudinal axis 48 through prechamber wall 54, although one or more ports through floor 56 might be provided.

Figure 3:
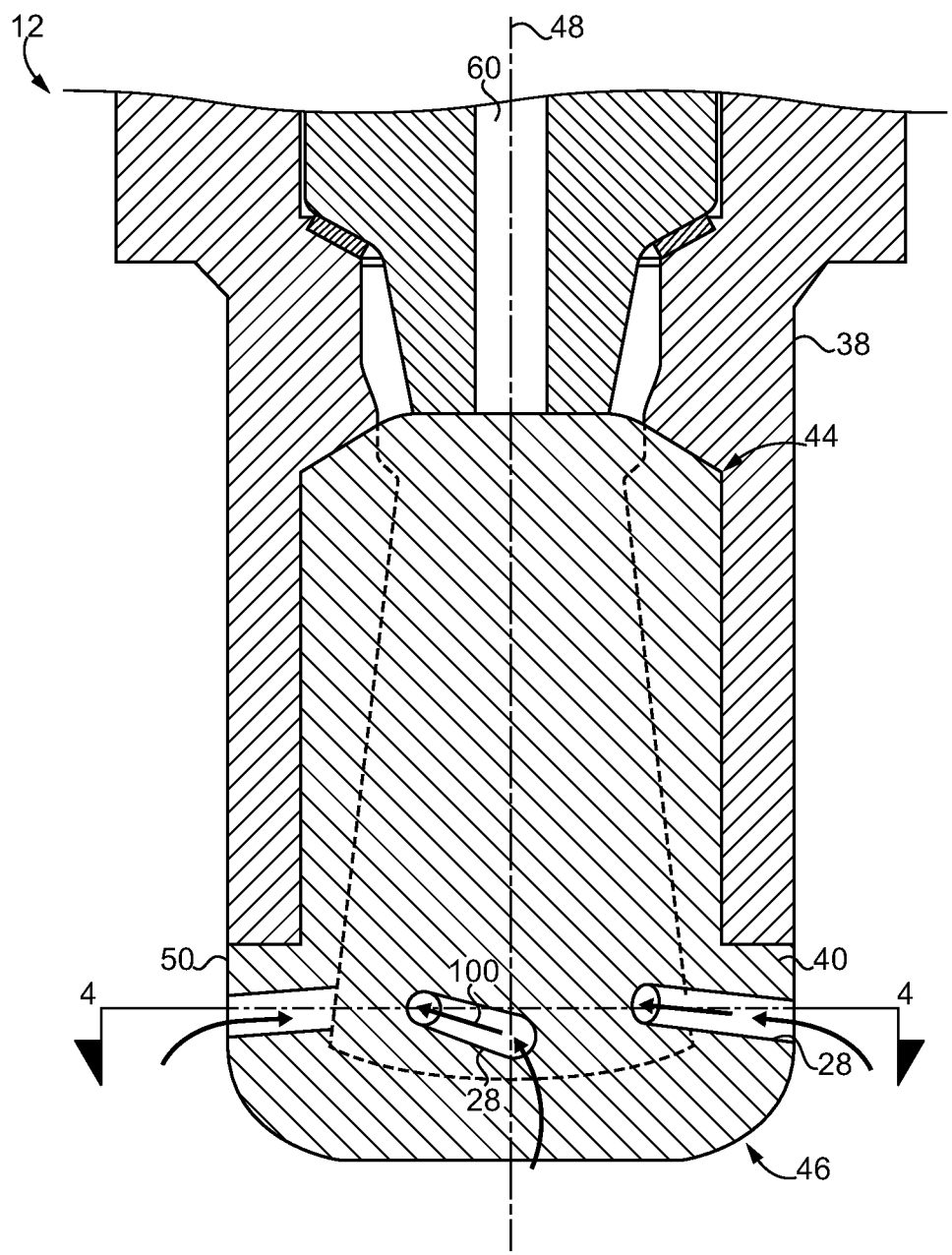
FIG. 3 is another diagrammatic illustration of a prechamber ignition device, according to one embodiment.
Figure 4:
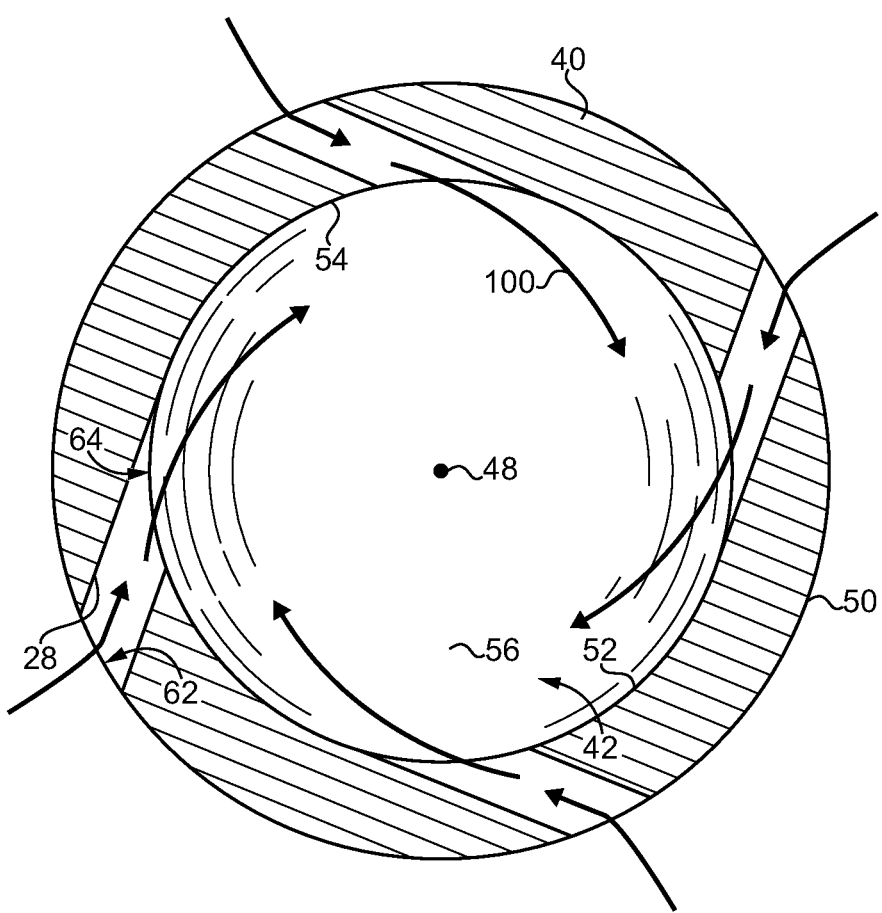
FIG. 4 is a sectioned view of the prechamber ignition device of FIG. 3, according to one embodiment.

Referring now also to FIG. 3, a diagrammatic view of prechamber device 12 is shown to illustrate the shape and orientation of ports 28 according to one embodiment. Ports 28 fluidly couple combustion chamber 20 with prechamber 42 such that combustion chamber 20 and prechamber 42 are in fluid communication to allow air and fuel to be urged into prechamber 42 from combustion chamber 20, and so that flame jets resulting from ignition and combustion of the air and fuel in prechamber 42 can be discharged to combustion chamber 20. Referring now also to FIG. 4, a sectioned view of FIG. 3 at line 4-4 is shown to further illustrate the structure and orientation of ports 28 according to one embodiment. Prechamber device 12 may include four ports 28 evenly spaced around a circumference of prechamber 42, though embodiments having a different number or arrangement of ports 28 are also contemplated. Each port 28 is formed in prechamber body 40 between exterior surface 50 and interior surface 52, and may have an outer opening 62 formed in exterior surface 50 and an inner opening 64 formed in interior surface 52. Each outer opening 62 may be circumferentially offset from a corresponding inner opening 64 so as to induce swirling in an incoming charge of fuel and air as the fuel and air contacts prechamber wall 54. As can be seen in FIG. 3, each inner opening 64 may also be axially offset from the corresponding outer opening 62 such that ports 28 may be inclined to longitudinal axis 48. In other embodiments, an angle of inclination of ports 28 may be more or less steep than the angle of inclination of ports 28 in FIG. 3, or ports 28 may not be inclined at all, instead extending between exterior surface 50 and interior surface 52 on a horizontal plane orthogonal to longitudinal axis 48. Ports 28 may be substantially straight between outer opening 62 and inner opening 64, and an inside surface of each port 28 defined by prechamber body 40 may be substantially cylindrical in shape. Ports 28 may also be oriented tangential to a circle centered on longitudinal axis 48, which arrangement can be readily visualized from FIG. 4. In some embodiments, inner openings 64 may be smaller than each corresponding outer opening 62 such that each port 28 narrows in the direction of interior surface 52 so as to increase a velocity of a charge of air and fuel entering prechamber 42. In still other embodiments, ports 28 could even be curved between outer opening 62 and inner opening 64, have a trumpet shape, different sizes or orientations, or still other variations among them. It should still further be appreciated that the internal geometry of prechamber 42 could be varied to assist in inducing swirling or to promote swirling or other flow properties in various ways apart from the embodiments described herein.

INDUSTRIAL APPLICABILITY

The present disclosure is applicable to prechamber-ignited internal combustion engines, which commonly combine gaseous fuel, such as natural gas, with air to form a relatively lean fuel mixture. While lean fuel mixtures may have certain advantages, such as reducing certain emissions, lean fuel mixtures may also pose ignition challenges, as the energy of an ignition spark may not be sufficient to reliably ignite the lean fuel mixture in a combustion chamber. While prechamber ignition addresses these challenges to a degree, lean mixtures can be difficult to ignite even within a prechamber, with the presence of mostly inert combustion products in the prechamber from the last engine cycle compounding the problem. Referring now again to FIG. 1, as piston 18 moves in cylinder 30 toward the BDC position during an intake stroke, fuel and/or air from intake duct 22 may be conveyed into combustion chamber 20. Once reaching the BDC position, piston 18 begins moving towards the TDC position during a compression stroke, at which time fuel and air present in combustion chamber 20 are mixed and compressed in combustion chamber 20. Compression in combustion chamber 20 also causes a charge of fuel and air to flow into prechamber device 12 through ports 28 from combustion chamber 20 as described herein, where the charge of air and fuel may mix with residual combustion gases present in prechamber 42.

Referring now also to FIG. 2, the charge of air and fuel entering prechamber 42 may be induced to swirl upon contacting prechamber wall 54, and the swirling fuel and air may be conveyed upwardly from ports 28 towards spark gap 61. Engine 10 may include an engine control module or other suitable control device (not pictured) structured to energize spark electrode assembly 60 to produce a high voltage arc extending from tip 57 to prechamber wall 54 for igniting a charge of air and fuel flowing through spark gap 61. Ignition of the charge results in creation of a flame kernel at spark gap 61. The flame kernel may then propagate, ultimately forming a stable flame that is discharged to combustion chamber 20 in the form of hot jets of the combusted and/or still combusting air and fuel mixture. In some instances, however, the flame kernel may be quenched before propagating, thereby terminating combustion, and resulting in a lean misfire.

Flame kernels may be quenched in a variety of ways. For example, flame kernels may be quenched by coming into contact with surfaces or objects in the prechamber, such as prechamber wall 54 or tip 57, that have a cooler temperature than the flame kernel, resulting in a transfer of heat energy from the flame kernel. It has been observed and/or theorized that turbulence in the prechamber may also quench a nascent flame kernel or contribute to quenching by other means, particularly in lean fuel mixtures. In some known systems, the flame kernel may remain in or proximate to the spark gap after formation, which may result in the flame kernel coming into contact with relatively cool surfaces in the prechamber such as an electrode tip, or being introduced to turbulence in the prechamber. In an effort to prevent contact with turbulence, some other known systems are apparently structured to remove the flame kernel from the prechamber altogether. Compounding these problems can be the presence of residual combustion products, within the prechamber and at the spark gap itself. In contrast to these and other known systems, combustion charge formation system 37 may instead be structured to facilitate stable flame production and flame propagation by displacing a newly formed flame kernel in a manner that shields the flame kernel from both quenching by turbulence and quenching by heat transfer.

Figure 5:
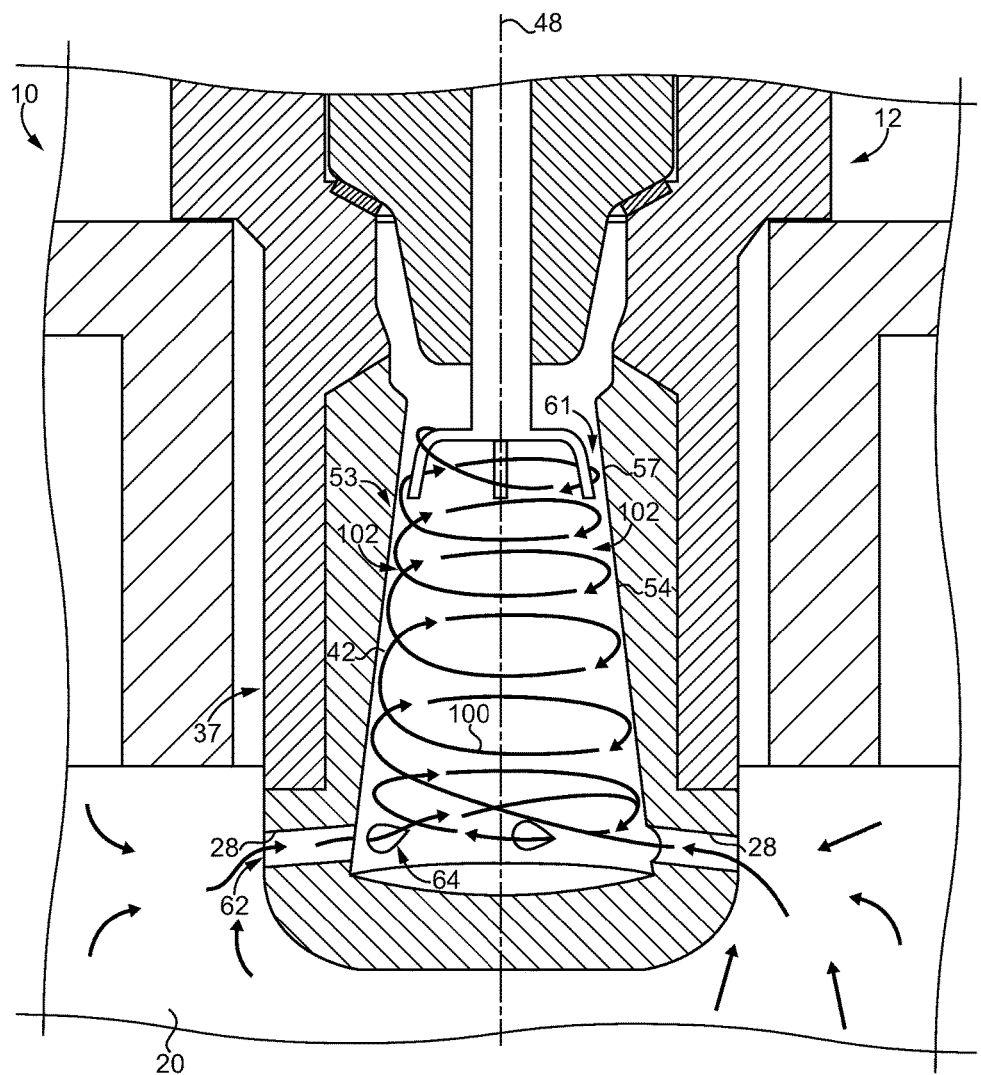
FIG. 5 is another diagrammatic illustration of a prechamber ignition device, according to one embodiment.

Referring now also to FIG. 5, a sectioned view of combustion charge formation system 37 is shown that illustrates a flow path 100 of the charge of air and fuel in prechamber 42. As discussed above, prechamber device 12 may be structured to admit air and fuel from combustion chamber 20 through ports 28 in response to upward travel of piston 18 during the compression stroke of an engine cycle. The offset orientation of outer openings 62 and inner openings 64 is structured to direct flows of the incoming fuel and air so as to induce swirling. Upon entering prechamber 42, the air and fuel comes into contact with prechamber wall 54, which includes taper 53, such that generally helical swirling of the air and fuel traveling along flow path 100 at a swirling region 102 is maintained. It will be appreciated that taper 53 may be structured to conserve momentum in the swirling air and fuel as the air and fuel is conveyed into and contacts taper 53 and travels through swirling region 102 from ports 28 towards spark gap 61. As taper 53 narrows in the direction of proximal end 44, a circumference of prechamber 42 diminishes as the air and fuel moves along flow path 100 towards spark gap 61. In this way, a reduction to a velocity of the swirling air and fuel is limited and a velocity of the air and fuel may be maintained or even increased as the air and fuel travels towards spark gap 61, eventually being ignited at spark gap 61 to form a flame kernel, which is then displaced by the swirling air and fuel. The swirling air and fuel can also displace residual combustion products at spark gap 61. In contrast, many known systems are not structured to maintain or increase velocity as the air and fuel travels towards a spark gap such that velocity is typically reduced at the spark gap and flame kernels may remain in or proximate to the spark gap after formation.

Figure 6:
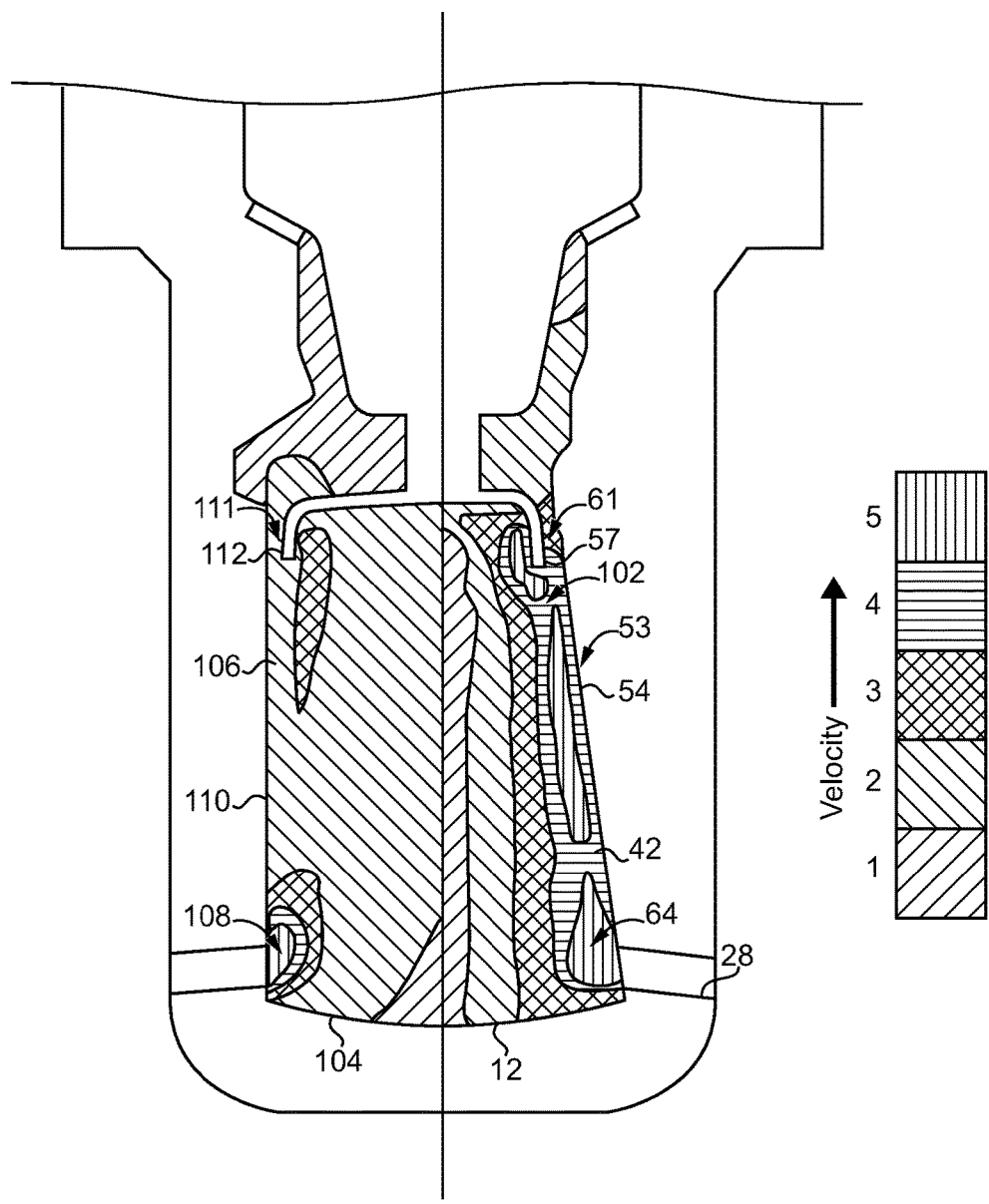
FIG. 6 is a diagrammatic illustration of relative velocity of fluid in a prechamber ignition device of the present disclosure in comparison to relative velocity of fluid in a known prechamber ignition device.

Referring now also to FIG. 6, an illustration of the relative velocity of air and fuel as might be observed in two different types of prechambers are shown. The right half of FIG. 6 is an illustration of flow that might be seen in prechamber device 12, and the left half of FIG. 6 is an illustration of flow that might be seen in a known prechamber ignition device (hereinafter, "prechamber device") 104 having a prechamber 106. Different velocities of a fixed mixture of air and fuel are shown with different sectioning. It will be appreciated that differing velocities are shown relative to each other and not necessarily representative of absolute values. For example, air and fuel having a velocity of 3 is not necessarily traveling 1.5 times as fast as air and fuel having a velocity of 2. On the right side of FIG. 6, it can be seen that air and fuel enters prechamber 42 at inner opening 64 having a relatively high velocity. The swirling motion induced by ports 28 and maintained by taper 53 results in the air and fuel in swirling region 102 maintaining a relatively high velocity as compared to regions of prechamber 42 radially inward of swirling region 102. Conversely, as can be seen on the left side of FIG. 6, air and fuel entering an inner opening 108 in a prechamber wall 110 of prechamber 106 initially has a relatively high velocity, but the relative velocity of the air and fuel is significantly reduced as the air and fuel moves towards a spark gap 111 between an electrode prong tip 112 and prechamber wall 110.

Referring now to FIGS. 5 and 6 generally, as discussed above, the swirling air and fuel may be spark-ignited at spark gap 61 to form a flame kernel. In prechamber 42, the flame kernel may then be displaced from spark gap 61 by way of the swirling air and fuel such that quenching of the flame kernel before stable flame production is prevented. As the velocity of the swirling air and fuel at spark gap 61 is relatively high, the swirling air and fuel may move the flame kernel away from tip 57 in a circumferential direction, and/or may move the flame kernel radially inward away from tip 57 relative to longitudinal axis 48. Either of these phenomena can limit or prevent negative heat transfer to prechamber body 40 and/or spark electrode assembly 60, and thus prevent quenching. Further, the swirling air and fuel may displace residual gases in prechamber 42 that remain from a prior combustion. These residual gases typically have little to no combustible fuel, which makes flame kernel propagation difficult, thereby increasing the chance that the kernel may be quenched before a stable flame is produced. In contrast, the relative velocity of the air and fuel at spark gap 111 may be insufficient to displace the flame kernel, which can result in the flame kernel staying near or approaching tip 112 and/or prechamber wall 110. The relatively low velocity of the air and fuel at spark gap 111 may also fail to displace residual gases.

Figure 7:
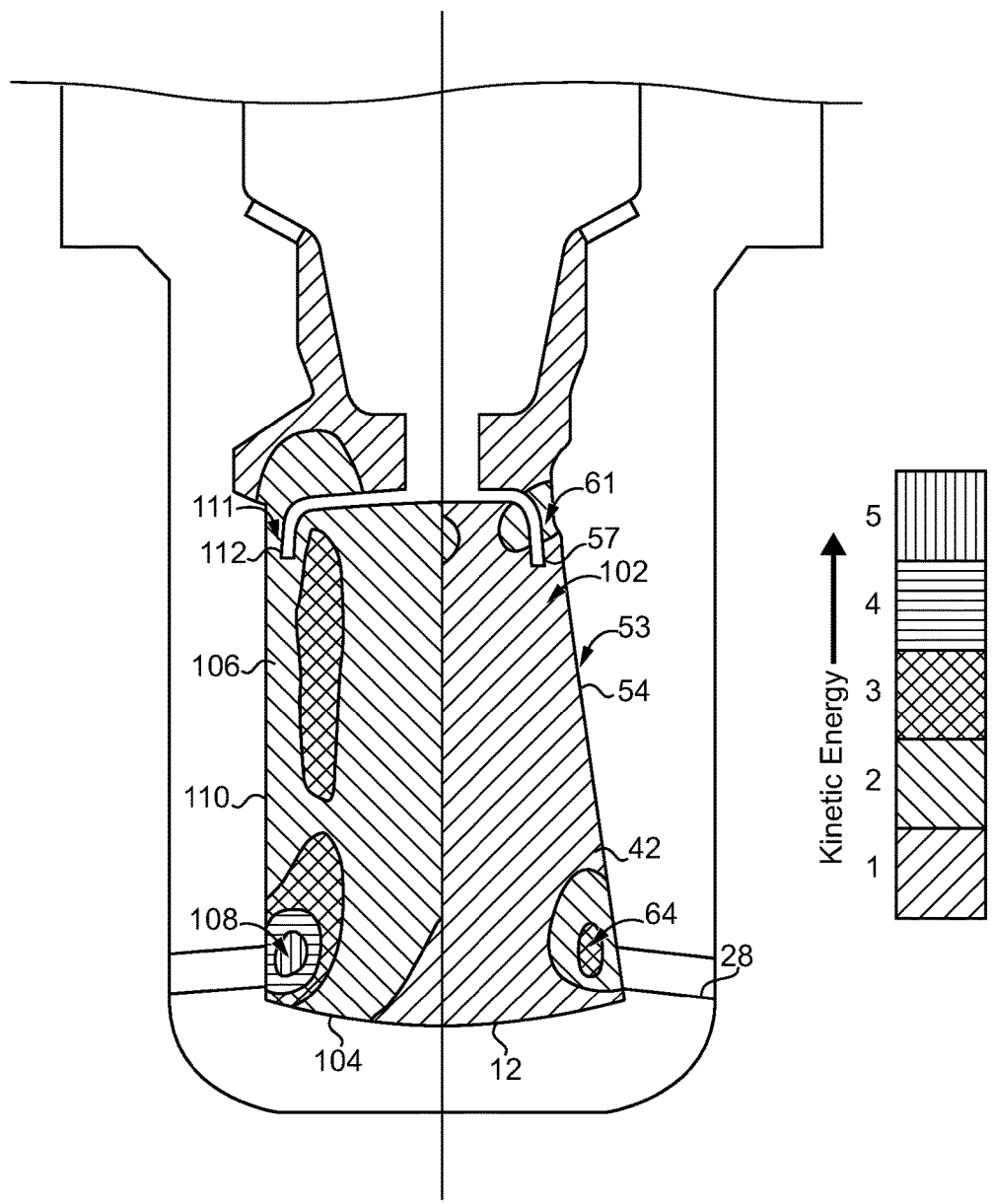
FIG. 7 is a diagrammatic illustration of relative kinetic energy of fluid in the prechamber ignition device of the present disclosure in comparison to relative kinetic energy of fluid in a known prechamber ignition device.

It will also be appreciated that by promoting a consistent, relatively high velocity swirling motion in the air and fuel, the flow of the air and fuel along flow path 100 may exhibit less turbulence in swirling region 102 and elsewhere. Referring now also to FIG. 7 an illustration of relative kinetic energy measurements of a mixture of air and fuel in prechamber device 12 (right) and prechamber device 104 (left) is shown. Different kinetic energies of the air and fuel are shown with different sectioning. It will be appreciated that differing kinetic energies are shown relative to each other and not necessarily representative of absolute values, analogous to the illustration seen in FIG. 6. It will be appreciated that kinetic energy is generally correlated with turbulence in the present context, in that air and fuel having relatively high kinetic energy may have relatively high turbulence as well. As can be seen in FIG. 7, air and fuel entering prechamber 42 at inner opening 64 has relatively high turbulence, but turbulence decreases thereafter and remains relatively low (i.e., kinetic energies of approximately 1) throughout prechamber 42. While the relative turbulence of air and fuel in prechamber 106 decreases after entering through inner opening 108, it can be seen that turbulence remains relatively high (i.e., kinetic energies between 2-3) in prechamber 106 as compared to the turbulence observed in prechamber 42. As discussed herein, exposing flame kernels to turbulence before the flame kernels propagate and produce stable flames may result in or contribute to quenching. Referring now to FIGS. 5-7 generally, it can be seen that the kinetic energy at spark gap 61 is low relative to the kinetic energy at spark gap 111. As such, flame kernels formed at spark gap 111 may encounter turbulence immediately after being formed. In contrast, flame kernels formed at spark gap 61 may be shielded from, and/or otherwise not exposed to, turbulence.

While some known flame kernel propagation strategies involve isolating flame kernels from turbulence by removing the flame kernels from the prechamber, such strategies do not generally address quenching by other means, such as negative heat transfer. It has been discovered, however, that a smooth flow of air and fuel having a relatively high velocity resulting from a prechamber ignition device structured to create a helical swirling motion in the air and fuel, such as prechamber device 12, may not only displace the flame kernels to move them from potentially cooling surfaces, but may also limit exposure to turbulence or otherwise shield the flame kernels from turbulence, and thereby increase the chances that the flame kernels stabilize and allow for more reliable initiation of combustion. It is further expected that the increase in velocity, or at least limit to reduction in velocity can be produced without a concomitant increase in turbulence.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different devices, assemblies, and systems having a variety of different structures than those specifically described herein. Other aspects, features and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A prechamber ignition device for an internal combustion engine, comprising:
   a prechamber body that includes an exterior surface, and an interior surface that defines a prechamber and includes a prechamber wall, the prechamber body having a proximal end structured for coupling with a spark electrode assembly, and a distal end, with a longitudinal axis extending between the proximal end and the distal end;
   a plurality of ports formed in the prechamber body at the distal end and each having an outer opening formed in the exterior surface and an inner opening formed in the interior surface, with each of the plurality of outer openings being circumferentially offset from the corresponding one of the inner openings such that the plurality of ports are oriented relative to the prechamber wall to induce swirling in an incoming charge of air and fuel; and
   the prechamber wall extending circumferentially around the longitudinal axis and having a taper that narrows in a direction of the proximal end.

2. The device of claim 1 further including a spark electrode assembly having an electrode prong that includes a tip, and being coupled with the prechamber body at the proximal end such that a spark gap is formed between the tip and the prechamber wall.

3. The device of claim 2 wherein the tip is positioned in the prechamber adjacent to the prechamber wall and at an axial location that is within the taper or adjacent to the taper.

4. The device of claim 2 further including a floor adjoining the prechamber wall, wherein the taper extends at least a majority of a length of the prechamber wall between the spark gap and the floor.

5. The device of claim 4 wherein the taper is uniform such that between the proximal end and the distal end the prechamber wall has a uniform inclination relative to the longitudinal axis.

6. The device of claim 4 wherein the prechamber has a frustoconical shape.

7. The device of claim 1 wherein the spark electrode assembly further includes a plurality of electrode prongs positioned within the prechamber and adjacent to the prechamber wall so as to form a plurality of spark gaps within or adjacent to the taper.

8. The device of claim 1 wherein each of the plurality of ports is substantially straight between the corresponding outer opening and inner opening, and oriented tangent to a circle centered on the longitudinal axis.

9. A combustion charge formation system for an internal combustion engine comprising:
   a combustion chamber formed in an engine housing;
   a prechamber ignition device including a prechamber body, a prechamber formed within the prechamber body and having a prechamber wall, and a spark electrode assembly;
   a port formed in the prechamber body and fluidly connecting the combustion chamber with the prechamber, the port extending between an outer opening and an inner opening, and the inner opening being offset from the outer opening such that the port is oriented relative to the prechamber wall to induce swirling in an incoming charge of air and fuel;
   the prechamber wall having a taper that narrows in a direction of the spark electrode assembly; and
   the spark electrode assembly having an electrode prong forming a spark gap with the prechamber wall for igniting the charge of air and fuel.

10. The system of claim 9 wherein the prechamber body defines a longitudinal axis extending between a proximal end and a distal end, and the prechamber wall extends circumferentially around the longitudinal axis.

11. The system of claim 10 wherein the prechamber wall has a conical shape between the port and the spark gap such that a circumferential travel distance of the air and fuel around the prechamber decreases as the swirling air and fuel travels from the port towards the spark gap.

12. The system of claim 10 further comprising a floor adjoining the prechamber wall, the prechamber body further defining a plurality of ports formed in the prechamber body and each extending between an outer opening formed in an exterior surface of the prechamber body and an inner opening formed in the prechamber wall, and
   wherein the taper extends uniformly from the floor to the spark gap such that the prechamber wall has a uniform inclination relative to the longitudinal axis within the taper.

13. The system of claim 12 wherein the taper extends at least a majority of a length of the prechamber wall between the spark gap and the floor.

14. The system of claim 12 wherein the plurality of ports are substantially cylindrical in shape such that each of the plurality of ports is substantially straight between the corresponding outer opening and inner opening.

15. The system of claim 9 wherein the spark electrode assembly has a plurality of electrode prongs positioned within the prechamber and adjacent to the prechamber wall so as to form a plurality of spark gaps within the taper or adjacent to the taper.

16. A method of operating an internal combustion engine, the method comprising:
   admitting air and fuel from a combustion chamber into a prechamber in response to upward travel of a piston in a compression stroke of an engine cycle;
   contacting the air and fuel with a prechamber wall so as to induce swirling of the air and fuel;
   conveying the air and fuel upwardly towards a spark gap within the prechamber;
   conveying the air and fuel into a taper formed by the prechamber wall such that a reduction to a velocity of the air and fuel is limited;
   spark igniting the air and fuel at a spark gap to form a flame kernel; and
   displacing the flame kernel from the spark gap by way of the air and fuel so as to prevent quenching of the flame kernel.

17. The method of claim 16 wherein the displacing of the flame kernel includes moving the flame kernel in a circumferential direction away from a tip of an electrode prong positioned in the prechamber, and away from the prechamber wall in a radially inward direction relative to a longitudinal axis extending between a distal end and a proximal end of the prechamber.

18. The method of claim 17 wherein the conveying of the air and fuel into the taper further includes reducing a circumferential travel distance of the air and fuel around the prechamber.

19. The method of claim 18 wherein the admitting of the air and fuel further includes receiving the air and fuel through a plurality of ports formed in the prechamber and each having an outer opening and an inner opening circumferentially offset from the inner opening about a longitudinal axis of the prechamber.

20. The method of claim 19 wherein the spark igniting further includes spark igniting the air and fuel at a plurality of spark gaps that are within the taper or adjacent to the taper.

\* \* \* \* \*